(12) United States Patent
Weh et al.

(10) Patent No.: US 12,325,393 B2
(45) Date of Patent: Jun. 10, 2025

(54) POWER BRAKE PRESSURE GENERATOR FOR A HYDRAULIC VEHICLE BRAKING SYSTEM

(71) Applicant: Robert Bosch GmbH, Stuttgart (DE)

(72) Inventors: Andreas Weh, Sulzberg (DE); Martin Hagspiel, Rettenberg (DE); Maximilian Wilhelm, Buchenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 421 days.

(21) Appl. No.: 17/777,749

(22) PCT Filed: Oct. 29, 2020

(86) PCT No.: PCT/EP2020/080347
§ 371 (c)(1),
(2) Date: May 18, 2022

(87) PCT Pub. No.: WO2021/115680
PCT Pub. Date: Jun. 17, 2021

(65) Prior Publication Data
US 2023/0001906 A1  Jan. 5, 2023

(30) Foreign Application Priority Data

Dec. 12, 2019 (DE) ...................... 10 2019 219 438.9

(51) Int. Cl.
*B60T 13/74* (2006.01)
*B60T 7/04* (2006.01)
*B60T 7/08* (2006.01)

(52) U.S. Cl.
CPC ............ *B60T 13/741* (2013.01); *B60T 7/042* (2013.01); *B60T 7/085* (2013.01); *B60T 13/745* (2013.01)

(58) Field of Classification Search
CPC ... B60T 7/04; B60T 7/042; B60T 7/08; B60T 13/74; B60T 13/741; B60T 13/745
See application file for complete search history.

(56) References Cited

U.S. PATENT DOCUMENTS

| 2015/0375727 A1* | 12/2015 | Weh ........................ F16H 57/00 |
| | | 29/428 |
| 2017/0130792 A1 | 5/2017 | Tandler et al. |
| 2018/0362006 A1* | 12/2018 | Weh ........................ G05G 5/03 |

(Continued)

FOREIGN PATENT DOCUMENTS

| CN | 103921781 A | 7/2014 |
| CN | 105221614 A | 1/2016 |

(Continued)

OTHER PUBLICATIONS

International Search Report for PCT/EP2020/080347 Issued Jan. 25, 2021.

*Primary Examiner* — Vishal R Sahni
(74) *Attorney, Agent, or Firm* — NORTON ROSE FULBRIGHT US LLP

(57) ABSTRACT

A pivot bearing of a ball screw of a power brake pressure generator for a hydraulic vehicle braking system is fastened at a hydraulic block with the aid of a sleeve that has an internal circumferential edge, which engages from above with the pivot bearing on a front face facing away from the hydraulic block. The sleeve has a flange that is caulked in an annular step in the hydraulic block.

15 Claims, 2 Drawing Sheets

(56) References Cited

U.S. PATENT DOCUMENTS

| | | | |
|---|---|---|---|
| 2020/0391718 A1* | 12/2020 | Choi | B60T 13/745 |
| 2021/0108709 A1* | 4/2021 | Leiber | F16D 65/16 |
| 2022/0144238 A1 | 5/2022 | Weh et al. | |
| 2022/0234560 A1* | 7/2022 | Weh | B60T 17/08 |

FOREIGN PATENT DOCUMENTS

| | | | |
|---|---|---|---|
| CN | 108216178 A | | 6/2018 |
| DE | 102007060045 A1 | | 6/2009 |
| DE | 102014212413 A1 | | 12/2015 |
| DE | 102015214585 A1 | | 2/2017 |
| DE | 102019217614 A1 | * | 3/2021 |
| EP | 3160804 B1 | | 7/2020 |
| JP | H07186652 A | | 7/1995 |
| JP | H08219127 A | | 8/1996 |
| JP | 2013075605 A | | 4/2013 |
| KR | 20190016790 A | * | 2/2019 |
| KR | 20190037894 A | * | 4/2019 |
| KR | 20190037942 A | * | 4/2019 |
| WO | 2013023953 A1 | | 2/2013 |
| WO | 2017089007 A1 | | 6/2017 |
| WO | WO-2018099636 A1 * | 6/2018 | B60T 13/745 |
| WO | 2019037965 A1 | | 2/2019 |

\* cited by examiner

POWER BRAKE PRESSURE GENERATOR FOR A HYDRAULIC VEHICLE BRAKING SYSTEM

BACKGROUND INFORMATION

PCT Patent Application WO 2013/023,953 A1 describes such a hydraulic block including a power brake pressure generator for a hydraulic vehicle braking system. The conventional hydraulic block includes a cylinder hole, in which a piston is situated axially shiftable. The piston is shiftable in the cylinder hole with the aid of an electric motor and a threaded drive having a spindle. By shifting the piston in the cylinder hole, it is possible to push away brake fluid from the cylinder hole and to generate a hydraulic brake pressure. By moving the piston in the cylinder hole back and forth, the brake pressure may be raised and lowered, i.e., it is possible to control or regulate the pressure.

FIELD

The present invention relates to a hydraulic block including a power brake pressure generator for a hydraulic vehicle braking system.

SUMMARY

The hydraulic block according to the present invention includes a power brake pressure generator. In accordance with an example embodiment of the present invention, the hydraulic block includes a cylinder hole, which is open on one side of the hydraulic block and in which a piston is situated axially shiftable. By shifting the piston in the cylinder hole, it is possible to push away brake fluid from the cylinder hole and to generate a hydraulic brake pressure. By moving the piston in the cylinder hole back and forth, the brake pressure may be raised and lowered, i.e., it is possible to regulate, which is also understood to mean to control, the brake pressure by moving the piston in the cylinder hole back and forth.

For the purpose of shifting the piston in the cylinder hole, the power brake pressure generator includes a threaded drive that converts a rotary driving motion into a shift and shifts the piston in the cylinder hole in a rotary drive. The threaded drive, technically speaking a rotatably drivable driving part of the threaded drive, is pivotable at the hydraulic block via a pivot bearing. The driving part is, for example, a nut or a spindle that shifts the spindle or nut and with it the piston in a rotary drive.

The cylinder hole in the hydraulic block, the piston that is shiftable in the cylinder hole, the threaded drive including the pivot bearing, and potentially a drive motor for a rotary drive of the threaded drive form the power brake pressure generator.

In the case of a return stroke of the piston, during which the piston increases a volume enclosed by it in the cylinder hole and aspirates brake fluid, a negative pressure may form in the cylinder hole that results in a force on the piston that is directed into the cylinder hole. To brace against such a force directed into the cylinder hole, the present invention provides an annular step in the hydraulic block at an orifice at an open side of the cylinder hole, at whose base the pivot bearing of the threaded drive is axially supported. It is possible to support the pivot bearing directly at the base of the annular step at the orifice of the cylinder hole or indirectly via a tubular pivot bearing holder, for example. A caulking or, generally speaking, a plastic deformation of the material of the hydraulic block that surrounds the orifice of the cylinder hole holds the pivot bearing at the hydraulic block. Here, it also applies that the plastically deformed material of the hydraulic block holds the pivot bearing directly or indirectly, for example via the pivot bearing holder, at the hydraulic block.

The plastically deformed material of the hydraulic block preferably holds the pivot bearing in a form-locked manner. For this purpose, the pivot bearing or the pivot bearing holder, at which the pivot bearing is fastened, has an undercut that engages from above or behind with the plastically deformed material of the hydraulic block and thus holds the pivot bearing at the hydraulic block. The undercut is a surface at the pivot bearing or at the pivot bearing holder facing away from the hydraulic block.

Refinements and advantageous embodiments of the present invention are disclosed herein.

All features provided in the description and the figures may be implemented individually on their own or in general in any arbitrary combination in the specific embodiments of the present invention. Embodiments of the present invention that do not include all, but only one or several feature(s) of a specific embodiment of the present invention are generally possible.

BRIEF DESCRIPTION OF THE DRAWINGS

The present invention is explained in greater detail below on the basis of two specific embodiments illustrated in the figures.

DETAILED DESCRIPTION OF EXAMPLE EMBODIMENTS

Figure 1:
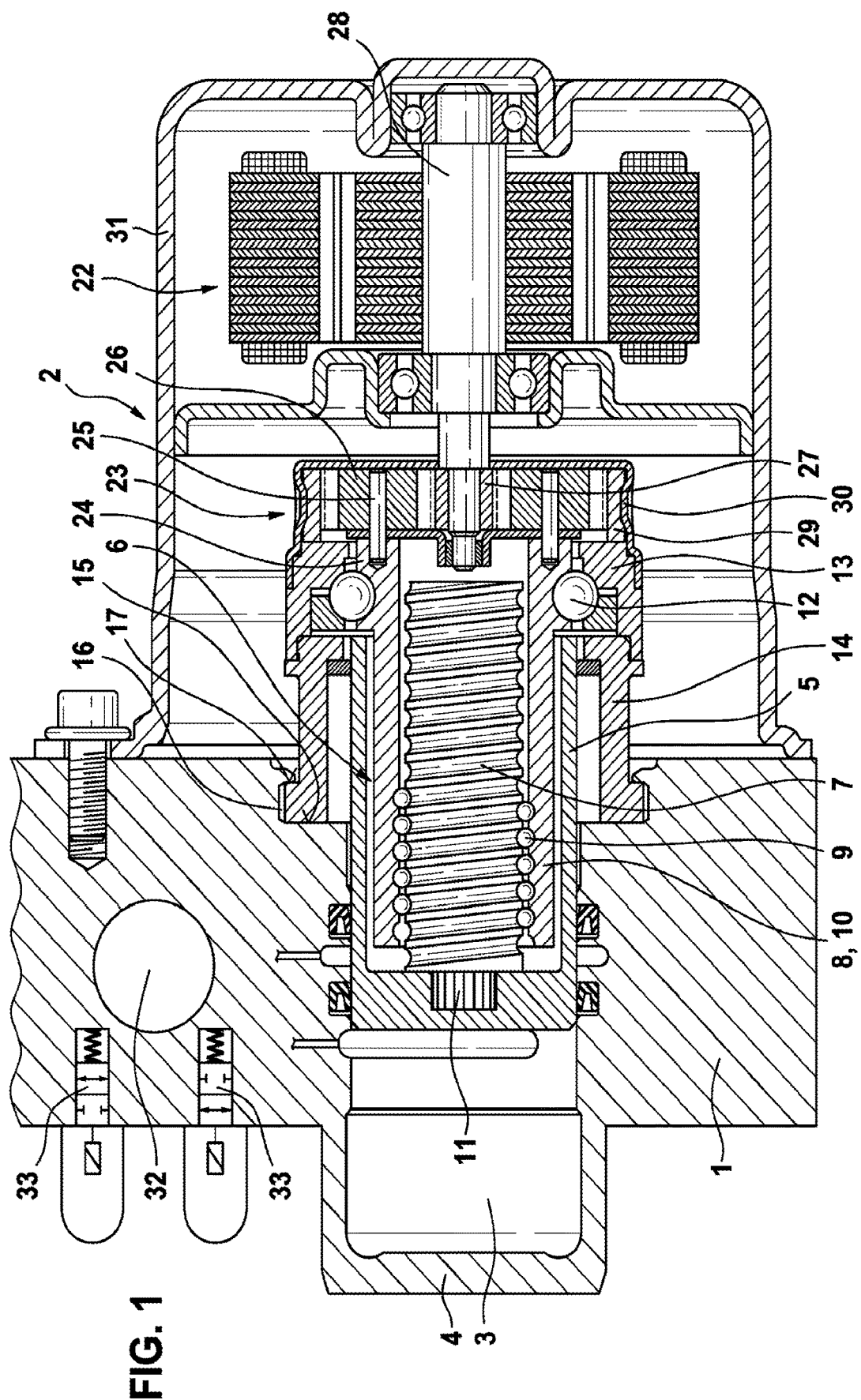
FIGS. 1 and 2 show sections of a hydraulic block according to the present invention axially through a power brake pressure generator.

Hydraulic block 1 according to the present invention illustrated in FIG. 1 includes a power brake pressure generator 2 for generating a brake pressure and for actuating hydraulic wheel brakes of a hydraulic vehicle braking system using external power. In the illustrated and described specific embodiment of the present invention, hydraulic block 1 is a cuboid-shaped, flat metal block made of an aluminum alloy, for example, at which wheel brakes (not illustrated) are or may be connected via brake lines.

Hydraulic block 1 has a cylinder hole 3 that is open on one side of hydraulic block 1, on a large side of cuboid-shaped hydraulic block 1 in the exemplary embodiment. On an opposite side, cylinder hole 3 is closed. In the exemplary embodiment, hydraulic block 1 has a cup-shaped molding 4 that elongates cylinder hole 3. A cover (not illustrated) is, for example, also possible.

A piston 5 is guided axially shiftable in cylinder hole 3. In the exemplary embodiment, piston 5 is directly guided in cylinder hole 3 in hydraulic block 1. Unlike in the illustration, piston 5 may also be guided in a cylinder liner, for example, which is situated in cylinder hole 3 (not illustrated).

By shifting piston 5 in cylinder hole 3 in the direction of the closed end, brake fluid may be pushed away from cylinder hole 3 for the purpose of generating brake pressure and of actuating the wheel brakes (not illustrated) that are or may be connected at hydraulic block 1. By moving piston 5 in cylinder hole 3 back and forth, the brake pressure may be raised and lowered, and the brake pressure may be controlled or regulated in this manner.

For shifting piston 5 in cylinder hole 3, power brake pressure generator 2 includes a ball screw 6 including a spindle 7, a tubular nut 8, which concentrically encloses spindle 7, and balls 9, which move in helical grooves outside of spindle 7 and inside of nut 8. In a rotary drive of nut 8, which forms in the present case a rotatably drivable drive element 10 of ball screw 6, spindle 7 shifts axially. In general, ball screw 6 may also be understood as a threaded drive or as a worm gear.

In the exemplary embodiment, piston 5 is designed as a tubular hollow piston, whose end facing the closed end of cylinder hole 3 is closed. Ball screw 6 is coaxially situated in piston 5 designed as a hollow piston, spindle 7 and nut 8 protruding from an open end of piston 5 from hydraulic block 1. To form a connection to piston 5, spindle 7 has a coaxial pin 11 that is pressed into a cylindrical indentation in the closed end of piston 5.

Nut 8, which forms drive element 10 of ball screw 6, is rotatably mounted at hydraulic block 1 outside of hydraulic block 1 via a pivot bearing 12, a ball bearing in the exemplary embodiment. An outer ring 13 of pivot bearing 12 is fastened at hydraulic block 1 with the aid of an annular or tubular pivot bearing holder 14. Pivot bearing holder 14 coaxially encloses nut 8 and is coaxial to pivot bearing 12. For the purpose of fastening pivot bearing 12 at pivot bearing holder 14, outer ring 13 of pivot bearing 12 is pressed onto an annular step of pivot bearing holder 14 and may be additionally connected to pivot bearing holder 14 by welding, for example friction welding or spot-welding, or in any other manner.

Pivot bearing holder 14 protrudes into an annular step 15 in hydraulic block 1 at an orifice of cylinder hole 3 on its open side and is axially supported at a base of annular step 15. Pivot bearing 12 or outer ring 13 of pivot bearing 12 is axially supported at hydraulic block 1 via pivot bearing holder 14. Embodiments without pivot bearing holder 14 are also possible, in which pivot bearing 12 or its outer ring 13 is supported (not illustrated) directly at the base of annular step 15 at the orifice of cylinder hole 3 in hydraulic block 1.

At an outer circumference, pivot bearing holder 14 has a parallel knurl, i.e., a multi-tooth profile 16, which is pressed into an inner circumference of annular step 15 for fastening same at hydraulic block 1. Pivot bearing 12 is fastened at hydraulic block 1 via pivot bearing holder 14. In the case of a return stroke of piston 5, during which piston 5 may increase a volume enclosed in cylinder hole 3, piston 5 may generate a negative pressure in cylinder hole 3 that effectuates an axial force on piston 5 in the direction of the closed end of cylinder hole 3. Pivot bearing 12 is supported against this axial force directed in the direction of the closed end of cylinder hole 3 via pivot bearing holder 14 at the base of annular step 15, which surrounds the orifice of cylinder hole 3 in hydraulic block 1. The axial force is transferred from piston 5 via spindle 7 and nut 8 of ball screw 6 to pivot bearing 12.

In addition to or alternatively to multi-tooth profile 16, pivot bearing holder 14 includes an annular step at its outer circumference, whose front face is facing an outer side of hydraulic block 1 and which forms an undercut 17. At annular step 15 at the orifice of cylinder hole 3, hydraulic block 1 is circumferentially caulked, i.e., the material of hydraulic block 1 surrounding the orifice of cylinder hole 3 is plastically deformed in such a way that it engages from above with the front face of the annular step, which forms undercut 17, at the outside of pivot bearing holder 14, by which pivot bearing holder 14 and, via pivot bearing holder 14, pivot bearing 12 is fastened at hydraulic block 1 in a form-locked manner.

Instead of indirect fastening via pivot bearing holder 14, pivot bearing 12 or its outer ring 13 may also be fastened directly at hydraulic block 1. Moreover, instead of pivot bearing holder 14, for example, pivot bearing 12 or its outer ring 13 may have (not illustrated) the parallel knurl that forms multi-tooth profile 16 and is pressed into annular step 15 at the orifice of cylinder hole 3, and/or, at its outer circumference, the annular step, to whose shape the material of hydraulic block 1 surrounding annular step 15 is plastically deformed.

Figure 2:
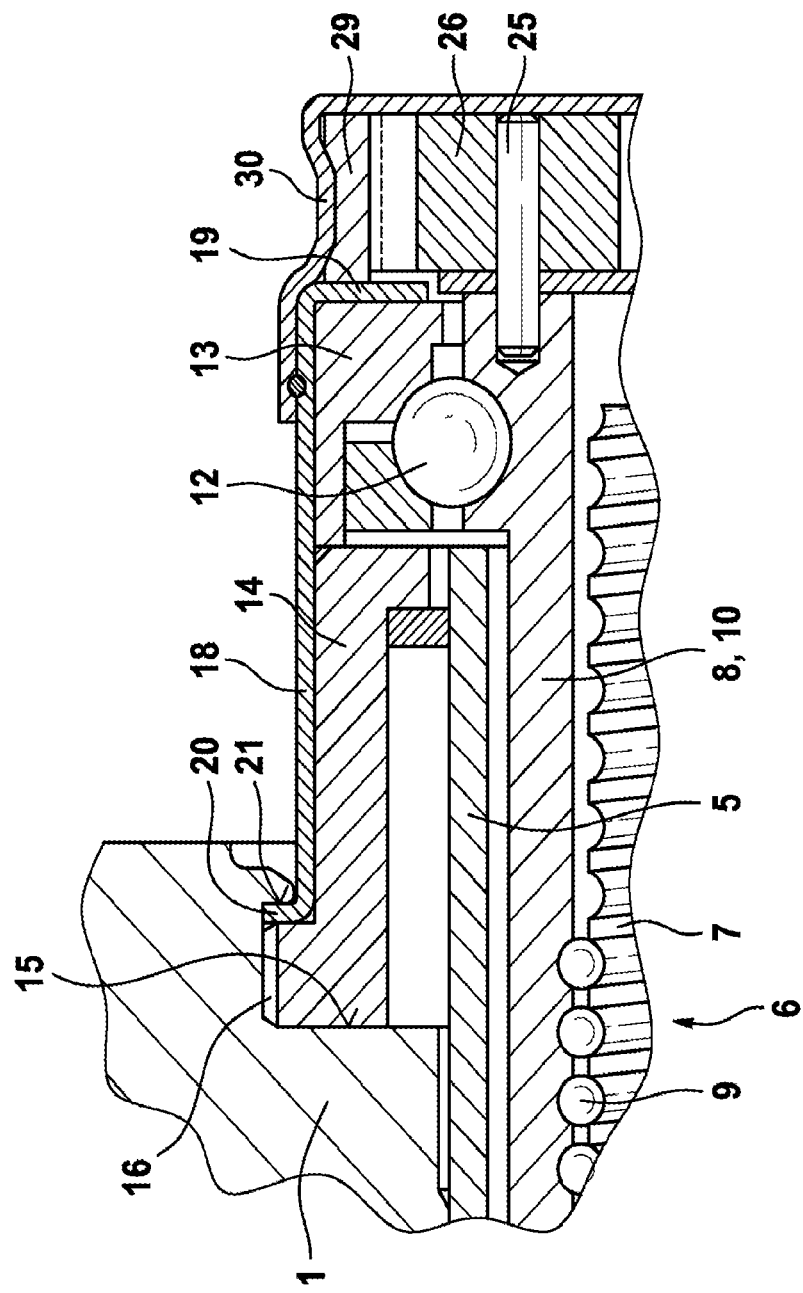

For the purpose of fastening pivot bearing 12 at hydraulic block 1, a tubular sleeve is provided in FIG. 2 as pivot bearing fastener 18 that coaxially encloses pivot bearing holder 14 and pivot bearing 12. At an end facing away from hydraulic block 1, pivot bearing fastener 18 has a circumferential inward edge 19 that engages from above or behind a front face of pivot bearing 12 or its outer ring 13 facing away from hydraulic block 1. In this way, pivot bearing 12 is axially held in pivot bearing fastener 18 in a form-locked manner.

At an opposite end in annular step 15, which surrounds the orifice of cylinder hole 3 in hydraulic block 1, pivot bearing fastener 18 has an outside flange 20 that is engaged from above by circumferentially caulked, i.e., plastically deformed, material of hydraulic block 1 surrounding annular step 15 at the orifice of cylinder hole 3, by which pivot bearing fastener 18 and, via pivot bearing fastener 18, pivot bearing 12 is fastened at hydraulic block 1. One side of flange 20 facing away from the base of annular step 15 forms an undercut 21 that engages from above or behind with the plastically deformed material of hydraulic block 1.

Similar to FIG. 1, in FIG. 2 pivot bearing holder 14 may also have a parallel knurl as a multi-tooth profile 16 that is pressed into the circumference of annular step 15 at the orifice of cylinder hole 3 in hydraulic block 1.

For the rotary drive of nut 8 forming drive element 10 of ball screw 6, power brake pressure generator 2 includes an electric motor 22 and a planetary gear set 23, which is situated between electric motor 22 and ball screw 6. Planetary gear set 23 and electric motor 22 are coaxially situated with regard to ball screw 6 and cylinder hole 3 at hydraulic block 1.

At the same time, nut 8 of ball screw 6 forms a planet carrier 24 of planetary gear set 23, on which planet wheels 26 of planetary gear set 23 are rotatably mounted on cylinder pins 25. Sun wheel 27 of planetary gear set 23 is rotatably fixedly situated on a motor shaft 28 of electric motor 22. An annulus gear 29 of planetary gear set 23 is rotatably fixedly situated in a cup-shaped holder 30 that engages from above with outer ring 13 of pivot bearing 12 and is, for example, fastened by spot-welding at outer ring 13 and/or pivot bearing holder 14.

Electric motor 22 is fastened outside on the side of hydraulic block 1, at which cylinder hole 3 is open. Planetary gear set 23 and spindle 7 and nut 8 of ball screw 6 protruding from hydraulic block 1, are located in a motor housing 31 of electric motor 22.

Electric motor 22, planetary gear set 23, ball screw 6 including pivot bearing 12, and cylinder hole 3 including piston 5, which is axially shiftable in same, form power brake pressure generator 2, electric motor 22, planetary gear set 23, and ball screw 6 including pivot bearing 12 forming an external power drive of power brake pressure generator 2.

Hydraulic block 1 includes, in addition to cylinder hole 3, a main brake cylinder bore 32, in which a main brake cylinder piston (not illustrated) may be situated that is mechanically shiftable in main brake cylinder bore 24 via a piston rod using a foot brake pedal or a hand brake lever. Via the foot brake pedal or the hand brake lever, a muscular power actuation of the vehicle braking system or of the wheel brakes, which are or may be connected to hydraulic block 1, is possible with the aid of the main brake cylinder piston. Moreover, main brake cylinder bore 32 together with the main brake cylinder shiftable therein and the foot brake pedal or the hand brake lever is used as a setpoint device for a brake pressure that is generated by power brake pressure generator 2.

Solenoid valves 33 are situated at or in hydraulic block 1 for the purpose of a brake pressure control and/or a slip control. Such slip controls are, for example, an anti-lock system, a traction control system and/or an electronic stability control system or electronic stability programs, for which the abbreviations ABS, TCS and/or ESC or ESP are commonly used. Such slip control systems are conventional and will not be explained here.

What is claimed is:

1. A hydraulic block including a power brake pressure generator for a hydraulic vehicle braking system, the hydraulic block comprising:
   a cylinder hole which is open on one side of the hydraulic block;
   a piston which is axially shiftable in the cylinder hole;
   a threaded drive configured to shift the piston in the cylinder hole; and
   a pivot bearing arrangement, using which a rotatably drivable drive element of the threaded drive is rotatably mounted at the hydraulic block;
   wherein:
     the cylinder hole has an annular step at an orifice on its open side, at whose base the pivot bearing arrangement is axially supported;
     a material of the hydraulic block surrounding the orifice of the cylinder hole is plastically deformed in such a way that it forms a radial slot axially bounded by opposing walls of the hydraulic block that axially face each other, with a portion of the pivot bearing arrangement being held to the hydraulic block within the radial slot; and
     the hydraulic block includes at least one of the following two features (I) and (II):
       (I) (i) the pivot bearing arrangement includes an axial extension section within which the piston extends and that terminates with an end of the pivot bearing arrangement that is formed as a lip that extends radially outward into the radial slot, (ii) a region of the axial extension section immediately adjacent to the lip does not extend radially outward as much as the lip and is at least partially arranged radially between a radially interior edge of one of the opposing walls and a radial exterior surface of the piston, (iii) the axial extension section extends from inside the hydraulic block to outside the hydraulic block, and (iv) there is a radial space between a radially interior surface of an entirety of the axial extension section and a radially exterior surface of the piston; and
       (II) the pivot bearing arrangement includes a knurl formed of axially extending ridges.

2. The hydraulic block as recited in claim 1, further comprising:
   a pivot bearing fastener, wherein the pivot bearing arrangement includes a piston support against which the piston is mechanically supported and a holding region that is held in the radial slot, the pivot bearing fastener engages with the pivot bearing arrangement in an axial direction in a form-locked manner and has an undercut extending into the radial slot, and the material of the hydraulic block surrounding the orifice of the cylinder hole is deformed in such a way that the radial slot engages from behind with the undercut of the pivot bearing fastener for holding the pivot bearing arrangement to the hydraulic block.

3. The hydraulic block as recited in claim 2, wherein the pivot bearing fastener engages from behind with a front face of the piston support that faces away from the hydraulic block.

4. The hydraulic block as recited in claim 2, wherein:
   the pivot bearing fastener is a sleeve that encloses a majority of the pivot bearing arrangement;
   the undercut is formed as an outward protruding flange, which is engaged from above by the deformed material surrounding the orifice of the cylinder hole in the hydraulic block; and
   a rear end of the pivot bearing fastener is formed as an internal perforated circumferential disk the extends radially inward and engages with a front face of the piston support facing away from the hydraulic block.

5. The hydraulic block as recited in claim 2, wherein the power brake pressure generator includes an electric motor configured to drive the threaded drive.

6. The hydraulic block as recited in claim 1, wherein:
   the pivot bearing arrangement includes the axial extension section within which the piston extends and that terminates with the end of the pivot bearing arrangement that is formed as the lip that extends radially outward into the radial slot;
   the region of the axial extension section immediately adjacent to the lip does not extend radially outward as much as the lip and is at least partially arranged radially between the radially interior edge of one of the opposing walls and the radial exterior surface of the piston; and
   the axial extension section extends from inside the hydraulic block to outside the hydraulic block with the radial space between the radially interior surface of the entirety of the axial extension section and the radially exterior surface of the piston.

7. The hydraulic block as recited in claim 6, wherein a radial extent of the radial space is approximately as large as at least a majority of a thickness of the region of the axial extension section immediately adjacent to the lip.

8. The hydraulic block as recited in claim 6, wherein the orifice of the cylinder hole is deformed in such a way that the one of the opposing walls engages from behind with the lip of the pivot bearing arrangement, thereby holding the pivot bearing arrangement to the hydraulic block.

9. The hydraulic block as recited in claim 1, wherein the pivot bearing arrangement includes the knurl formed of the axially extending ridges.

10. The hydraulic block as recited in claim 9, wherein the ridges of the knurl are molded into an inner circumference of the hydraulic block between the opposing walls.

11. The hydraulic block as recited in claim 1, wherein the pivot bearing arrangement includes a piston support against which the piston is mechanically supported and a holder to which the piston support is held, with a portion of the holder being held within the radial slot.

12. The hydraulic block as recited in claim 11, wherein the piston support includes a ball bearing.

13. The hydraulic block as recited in claim 11, wherein the piston support is held to the holder by a form-fit between the piston support and the holder.

14. The hydraulic block as recited in claim 13, wherein the piston support includes a radially interiorly facing surface and the holder includes a radially exteriorly facing surface, the interiorly facing and exteriorly facing surfaces facing and engaging with each other.

15. The hydraulic block as recited in claim 13, further comprising a pivot bearing sleeve that holds the piston support to the holder.

\* \* \* \* \*